United States Patent [19]

Zürcher

[11] Patent Number: 4,888,676
[45] Date of Patent: Dec. 19, 1989

[54] DAMPING CIRCUIT FOR TURN-OFF VALVES

[75] Inventor: Urs Zürcher, Turgi, Switzerland

[73] Assignee: BBC Brown Boveri AG, Baden, Switzerland

[21] Appl. No.: 280,641

[22] Filed: Dec. 6, 1988

[30] Foreign Application Priority Data

Dec. 7, 1987 [CH] Switzerland ............ 4779/87

[51] Int. Cl.⁴ ............................................. H02M 1/06
[52] U.S. Cl. ........................................ 363/58; 363/68; 363/137
[58] Field of Search ................ 363/54, 57, 58, 68, 363/136, 137; 307/633, 640, 641; 361/91

[56] References Cited

U.S. PATENT DOCUMENTS

| | | | |
|---|---|---|---|
| 3,872,372 | 3/1975 | Kautz et al. | 363/137 |
| 4,611,276 | 9/1986 | McMurray | 363/58 |
| 4,639,850 | 1/1987 | Asaeda et al. | 363/58 |
| 4,710,862 | 12/1987 | Asaeda | 363/58 |
| 4,745,513 | 5/1988 | McMurray | 363/57 |

FOREIGN PATENT DOCUMENTS

| | | | |
|---|---|---|---|
| 0134508 | 3/1985 | European Pat. Off. | 363/136 |
| 2641183 | 3/1978 | Fed. Rep. of Germany . | |
| 136173 | 10/1981 | Japan | 363/136 |
| 67878 | 4/1984 | Japan | 363/58 |
| 213271 | 10/1985 | Japan | 363/57 |
| 213272 | 10/1985 | Japan | 363/57 |
| 61-161971 | 7/1986 | Japan . | |
| 230367 | 10/1987 | Japan . | |

OTHER PUBLICATIONS

Electronique de Puissance, Sep. 1985, pp. 11–13.

Primary Examiner—William H. Beha Jr.
Attorney, Agent, or Firm—Burns, Doane, Swecker & Mathis

[57] ABSTRACT

Converter inverters, such as are used in the operation of alternating current machines, have turn-off reverse-conducting GTO thyristors in the bridge arms. Parallel to each GTO thyristor there is provided a series circuit composed of a turn-off load-shedding capacitor with a turn-off load-shedding diode. The common junction points of the respective turn-off load-shedding capacitors and diodes are connected in series to a choke via at least one capacitor load-shedding diode. The inductance of the choke is 2 to 3 times as large as the inductance of the circuit. The reverse-conducting GTO thyristors are directly connected in series, without the series connection of a choke. There thus arises a damping circuit of the GTO thyristor, which is very simple and, at the same time, feed back ring-around energy.

7 Claims, 1 Drawing Sheet

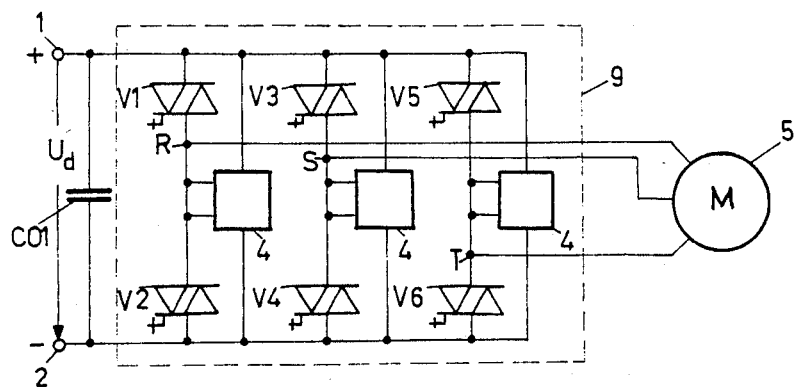
FIG.1
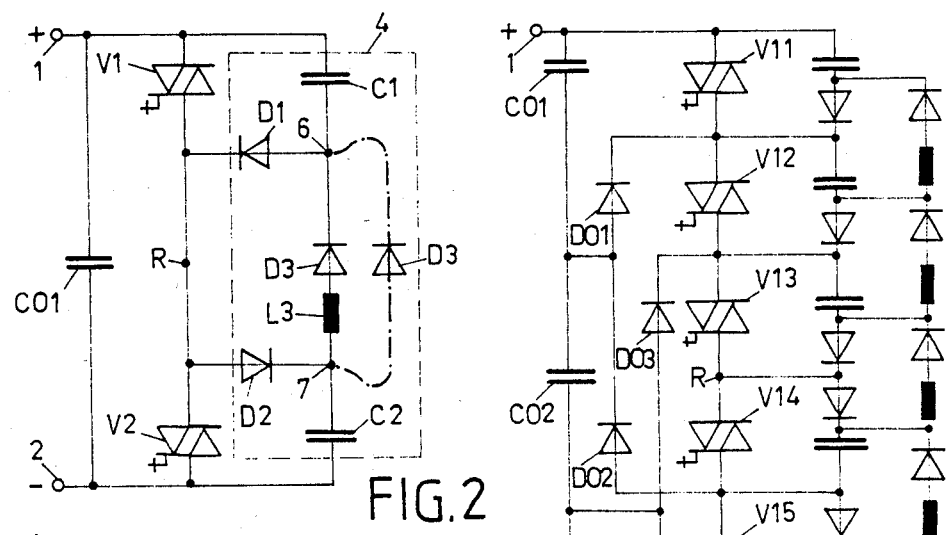
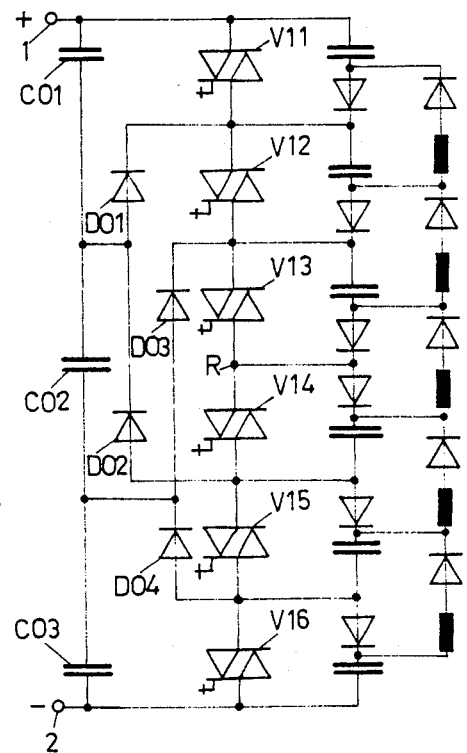
FIG.4
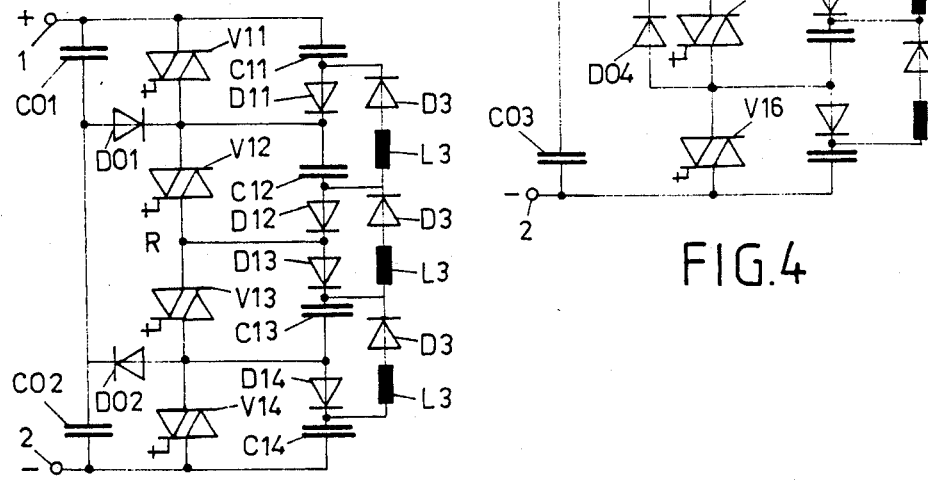
FIG.2
FIG.3

DAMPING CIRCUIT FOR TURN-OFF VALVES

BACKGROUND OF THE INVENTION

1. Field of the Invention The present invention relates to a damping circuit for at least two Series-connected turn-off valves according to the preamble of Patent claim 1.

2. Discussion of Background

A known damping circuit is disclosed in the French journal "Electronique de puissance" ("Power electronics"), 11 Sept. 1985, pages 12 and 13. In the circuit represented there in FIG. 3, two GTO thyristors are connected in series via a choke with mid-point tapping. Connected in parallel to each GTO thyristor with anti-parallel free-wheeling diode is a series circuit of a turn-off load-shedding capacitor with a turn-off load-shedding diode. The common junction points of the turn-off load-shedding capacitor and turnoff load-shedding diode of the two series circuits are interconnected, on the one hand, via a primary winding of a transformer, the secondary winding of the transformer being connected to the supply direct voltage via a diode, and, on the other hand, via a further series circuit of three diodes and an ohmic resistance. The capacitor ring-around energy can be recovered with this damping circuit. However, the damping circuit is relatively expensive in view of a number of its components. Electric losses occur both in the ohmic resistance, and also in the choke with midpoint tapping.

Concerning the prior art, reference is made in addition to EP-B1-0,134,508. In the circuit represented there in FIG. 4, two GTO thyristors are directly connected in series in each case to a choke with mid-point tapping, there being no interconnection. Parallel to each GTO thyristor, a turn-off load-shedding diode is connected in series to a turn-off load-shedding capacitor. When each GTO thyristor is switched in, the turn-off load-shedding capacitor is discharged via an auxiliary thyristor, especially a breakover voltage thyristor and two diodes, an energy storage choke and the GTO thyristor. Thereafter, a free-wheeling current flows through the energy storage choke, the GTO thyristor and a free-wheeling diode. When the load thyristor is switched out, a portion of the energy temporarily stored in the energy storage choke is used to recharge the turn-off load-shedding capacitor, and a portion is fed back into a direct-voltage source. In this way, an inductive load can be controlled inexpensively via clearly defined switching times. The energy storage choke has an inductance which is approximately $10^4$ times as large as the inductance of the circuit composed of GTO thyristor and the series connection, parallel thereto, of turn-off load-shedding capacitor and turn-off load-shedding diode.

Additionally, reference is made to DE-B2-2,641,183. In the low-loss damping circuit given there of two electrical or electronic one-way switches connected in series e.g. two npn transistors, there is provided parallel to each one-way switch, in accordance with a variant, a series circuit of a load-shedding capacitor and a load-shedding diode, the load-shedding diode being of the same polarity as the one-way switch. Parallel to each load-shedding diode, a discharge coil is connected in series to a discharge diode, which has the opposite polarity to that of the load-shedding diode. This damping circuit does not enable recovery of the ring-around energy; it requires 2 discharge diodes and 2 discharge coils. When a one-way switch is turned off, only the respective associated load-shedding capacitor operates.

SUMMARY OF THE INVENTION

Accordingly, one object of this invention is to achieve the object by providing a novel damping circuit or at least two series-connected turn-off valves, which manages with fewer components and exhibits fewer electrical losses.

An advantage of the invention consists in that no choke has to be provided in series with the turn-off valves. This reduces the electrical losses. Moreover, the turn-off load-shedding capacitors can be dimensioned approximately 25% times smaller, than otherwise necessary according to the data from the manufacturers of the GTO thyristors. The turn-off load-shedding capacitor of the second turn-off valve of two turn-off valves connected in series contributes approximately 50% to the turn-off load-shedding of the first turn-off valve, and the turn-off load-shedding capacitor of the first turn-off valve contributes approximately 50% to the turn-off load-shedding of the second turn-off valve. In this way, it is achieved that readiness for turning off exists immediately after the firing of a turn-off valve. In practice, the earliest instant of the turn-off pulse is not determined by the damping circuit. The damping circuit operates independently of the circuit state of the turn-off valves; it can also be used with zero-point circuits. No transformer with diode is required in the circuit of the secondary winding in order to recover energy.

According to an advantageous embodiment of the invention, correct dimensioning of an inductive reactance in series with a turn-off load-shedding diode between the turn-off load-shedding capacitors of two turn-off valves makes it possible to reduce a ring-back upon the discharge of these turn-off load-shedding capacitors via the particular turn-off valve, so that these valves are subjected to a lower load.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a three-phase inverter for supplying an alternating-current machine, having turn-off valves in the bridge arms and a low-loss damping circuit per phase of the inverter;

FIG. 2 shows a circuit according to FIG. 1 having two turn-off valves connected in series for an inverter phase, with detailed damping circuit;

FIG. 3 shows a circuit having four turn-off valves connected in series for an inverter phase, with detailed damping circuit; and FIG. 4 shows a circuit, having six turn-off valves connected in series for an inverter phase, with detailed damping circuit.

DESCRIPTION OF THE PREFERRED EMBODIMENTS

Referring now to the drawings, wherein like reference numerals designate identical or corresponding parts throughout the several views, in FIG. 1, 1 designates a positive terminal and 2 the negative terminal of a three-phase inverter 3 having alternating voltage phases R, S, T, which are connected to an alternating-current machine or three-phase machine 5. The inverter 3 is a part of a converter (not represented) having a direct voltage link, to which a direct voltage $U_d$ is applied between the terminals 1 and 2 from a rectifier of the converter. A link capacitor C01 is connected between the terminals 1 and 2.

Turn-off valves with antiparallel diodes or reverse-conducting GTO thyristors V1, V2, or V3, V4 or V5 or V6 form three pairs of valve arms of the inverter 3, corresponding to the alternating voltage phases R, S, T, which are connected, in each case, to a damping circuit 4.

FIG. 2 shows the circuit of a low-loss damping circuit 4 in conjunction with two series-connected reverse-conducting first and second GTO thyristors V1 and V2 according to FIG. 1. Parallel to each reverse-conducting GTO thyristor V1 or V2, there is connected a series circuit of a first or second turn-off load-shedding capacitor C1 or C2 and a first or second turn-off load-shedding diode D1 or D2, the particular turn-off load-shedding diode D1 or D2 being poled in the same direction as the associated reverse-conducting GTO thyristor V1 or V2. A common junction point 6 of the first turn-off load-shedding capacitor and the first turn-off load-shedding diode D1 is connected electrically to a common junction point 7 of the second turn-off load-shedding capacitor C2 and the second turn-off load-shedding diode D2 via a series circuit composed of a capacitor load-shedding D2 and an inductive reactance or a choke L3. The inductance of the inductive reactance L3 is 1.5 to 5 times, preferably 2 to 3 times, as large as the inductance of the inductive reactance of the circuit V1, C1, D1 or V2, C2, D2. Instead of a special choke L3, the same inductance can be provided as a conductor loop in the shape of several 10 cm cables in series with the capacitor load-shedding diode D3, as indicated in FIG. 2 by dots and dashes. Typical values for the turn-off load-shedding capacitor C1 and C2 are 2.8 μF and 2500 V.

FIG. 3 shows a circuit suitable for very high direct voltages having four series-connected, reverse-conducting GTO thyristors V11–V14 for an inverter phase R. Connected in parallel to each of the reverse-conducting GTO thyristors V11–V14 is a series circuit composed of a turn-off load-shedding capacitor C11 and a turn-off load-shedding diode D11 or C12, D12 or C13, D13 or C14, D14. Common junction points of turn-off load-shedding capacitor and turn-off load-shedding diode of respectively two adjacent series-connected, reverse-conducting GTO thyristors are conductively connected in a unidirectional fashion via a series circuit composed of a capacitor load-shedding diode D3 and a choke L3.

Two link capacitors C01 and C02 are connected in series between terminals 1 and 2. The common junction point of the link capacitors C01 and C02 is connected, on the one hand, via a first diode D01 to the cathode of the reverse-conducting GTO thyristor V11 and, on the other hand via a second diode D02 to the anode of the reverse-conducting GTO thyristor V14, these diodes being of the same polarity as the GTO thyristors mentioned. In this connection, the direct voltage $U_d/2$ occurs at each GTO thyristor.

FIG. 4 shows a circuit corresponding to FIG. 3, but having six series-connected, reverse-conducting GTO thyristors V11–V16. Here, three link capacitors C01–C03 are connected in series between the direct voltage terminals 1 and 2, i.e. half as many as GTO thyristors. The common junction point of the first and second link capacitor C01 or C02 is connected to the common junction point of the first and second reverse-conducting GTO thyristor V11 or V12 via a first diode D01, and to the common junction point of the fourth and fifth reverse-conducting GTO thyristor V14 or V15 via a second diode D02. The common junction point of the second and third link capacitor C02 and C03 is connected to the common junction point of the second and third reverse-conducting GTO thyristor V12 or V13 via a first diode D03, and to the common junction point of the fifth and sixth reverse-conducting GTO thyristor V15 or V16 via a second diode D04. In this connection, the direct voltage $U_d/3$ occurs at each GTO thyristor.

It stands to reason that this series connection principle can be extended to n series-connected valves, n being an even number $\geq 4$. In this case, n/2 link capacitors are connected in series parallel to the n valves, so that the direct voltage $2 \times U_d/n$ occurs at each valve. The common junction point of the mth and (m+1)th link capacitor is connected to the common junction point of the mth and the (m+1)th turn-off valve via a first diode, and to the common junction point of the (n/2+m)th and (n/2+m+1)th turn-off valve via a second diode, m=1 ... (n/2−1).

The operation of the damping circuit according to the invention is now to be explained with reference to the circuits of FIGS. 1 and 2.

State 1: In the stationary state, a constant current flows from the positive terminal 1 to the inductive reactance via the switched-in valve V1, i.e. into the alternating-current machine 5 via the alternating voltage phase.

State 2: After the valve V1 has been turned off, the turn-off load-shedding capacitor C1 is recharged with a charging current from the positive terminal 1 via C1, D1 and the inductive reactance 5, while the turn-off load-shedding capacitor C2 is discharged via L3, D3, D1 and the inductive reactance 5. In this process, the sum of the recharging and the discharging current through the inductive reactance 5 remains constant.

State 3: A constant load current forced by the inductance of the load 5 flows back through the antiparallel diode of the valve V2 via the load 5.

State 4: When the valve V1 is switched in, the turn-off load-shedding capacitor C2 is recharged by the positive terminal 1 via V1, D2 and the negative terminal 2. At the same time, the turn-off load-shedding capacitor C1 is discharged via V1, D2, L3, D3. At the same time, a constant current flows into the load 5 from the positive terminal 1 via V1, corresponding to the state 1.

It is important that the capacitor load-shedding diode D3 is used to discharge the turn-off load-shedding capacitors C1 and C2. This diode is rendered "slow" via a somewhat larger inductance L3, in contrast to the two other circuits C1, V1, D1 and C2, V2, D2, which are to be constructed with as low an inductance as possible. Since the two turn-off load-shedding capacitors C1 and C2 are parallel when the valves are turned off, the damping circuit becomes small with regard to the capacity of the turn-off load-shedding capacitors C1 and C2. Each turnoff load-shedding capacitor functions fully for the associated GTO thyristor, and not entirely fully for the second GTO thyristor, because L3 is connected in series to D3.

Depending on the operating state, (GTO thyristor conducting or not), more or less ring-around energy is fed back into the direct voltage source.

In principle, the choke L3 could, instead of being connected in series to the capacitor load-shedding diode D3, also be connected between the valves V1 and V2, it being necessary to connect the turn-off load-shedding diodes D1 and D2 to a mid-point tapping. However, this would have the disadvantage that because of the relatively high load current the electrical losses would amount to approximately $10^3$ times by comparison with those for the given circuit. With the object of the present invention, there is no need for chokes in series with the turn-off valves.

For the purpose of vibration damping, it would also be possible to provide, instead of, or additionally in series with, the choke L3 an ohmic resistance, the resistance of which preferably has the value C denoting the capacity of a turn-off load-shedding capacitor C1 or C2, and L the inductance of a capacitor load-shedding circuit C2, L3, D3, D1, V1 or C1, V1, D2, L3, D3.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Damping circuit for at least two series-connected turn-off valves
   (a) a series circuit composed of a turn-off load-shedding capacitor and a turn-off load-shedding diode pole in the same direction as the turn-off valve being provided parallel to each turn-off valve, and
   (b) the common junction points of turn-off load-shedding capacitors and turn-off load-shedding diodes of respectively two series-connected turn-off valve being conductively interconnected in a unidirectional fashion via at least one capacitor load-shedding diode, wherein,
   (c) the turn-off valves are directly connected in series.

2. Damping circuit according to claim 1, wherein the common junction points of said turn-off load-shedding capacitor and said turn-off load-shedding diode of respectively two series-connected turn-off valves are conductively interconnected in series to an inductive reactance in an unidirectional fashion via the capacitor load-shedding diode.

3. Damping circuit according to claim 2, wherein the inductance of the inductive reactance is 1.5 to 5 times as large as the inductance of the circuit of a turn-off valve and of the series circuit parallel thereto composed of a turn-off load-shedding capacitor with a turn-off load-shedding diode.

4. Damping circuit according to claim 1, wherein
   (a) n turn-off valves are connected in series, n being an even integer greater than 4,
   (b) n/2 link capacitors are connected in series parallel to the n turn-off valves and
   (c) a common junction point of the mth and (m+1)th link capacitor is effectively connected to the common junction point of the mth and (m+1)th turn-off valve via a first diode, and to the common junction point of the (n/2+m)th and (n/2+m+1)th turn-off valve via a second diode, m=1 . . . (n/2−1).

5. Damping circuit according to claim 1 wherein the turn-off valves are GTO thyristors.

6. Damping circuit according to claim 1 wherein
   (a) a free-wheeling valve is connected antiparallel to each turn-off valve or
   (b) the turn-off valves are reverse-conducting.

7. The damping circuit of claim 2, wherein the inductance of the inductive reactance is 2 to 3 times as large as the inductance of the circuit of a turn-off valve and of the series circuit parallel thereto composed of a turn-off load-shedding capacitor with a turn-off load-shedding diode.

* * * * *